June 13, 1933.  M. H. ROBERTS  1,913,411
LOCOMOTIVE BOOSTER MOTOR
Filed July 8, 1931   3 Sheets-Sheet 1

INVENTOR.
Montague H. Roberts
BY
ATTORNEYS.

June 13, 1933.  M. H. ROBERTS  1,913,411
LOCOMOTIVE BOOSTER MOTOR
Filed July 8, 1931  3 Sheets-Sheet 2

INVENTOR.
Montague H. Roberts
BY
ATTORNEYS.

Patented June 13, 1933

1,913,411

UNITED STATES PATENT OFFICE

MONTAGUE H. ROBERTS, OF ENGLEWOOD, NEW JERSEY, ASSIGNOR TO FRANKLIN RAILWAY SUPPLY COMPANY, OF NEW YORK, N. Y., A CORPORATION OF DELAWARE

LOCOMOTIVE BOOSTER MOTOR

Application filed July 8, 1931. Serial No. 549,446.

This invention relates to locomotive booster apparatus and particularly to an improved controlling system therefor by means of which slipping of the booster driven wheels can be stopped without interfering with the functions or disturbing the position of the parts of the controlling system as a whole and especially without the necessity of disentraining the booster motor as is some times necessary with the equipment at present in use.

As is now well known in the art, locomotive booster motors are normally disentrained from the axle which they are adapted to drive, and suitable entraining motors are provided, preferably fluid actuated, which are automatically supplied with operating pressure when the engineer raises the so-called booster latch while the reverse lever is in position for starting the locomotive or for slow running. A booster throttle is also customary in this art, and after entrainment has been effected the fluid pressure is adapted to actuate a small motor for opening the throttle. It will thus be seen that the entraining mechanism and the throttle operating mechanism are both subject, in the first instance, to the pilot control of the reverse lever pilot valve. Of course, other portions of the booster controlling system are similarly under the control of the reverse lever pilot valve, because all of the air or other fluid pressure which is utilized in controlling the action of the booster motor is delivered to the booster system through the reverse lever pilot valve.

The foregoing arrangement has been adopted in order to meet certain practical operating conditions which it is important to take care of in a satisfactory manner in order to provide for efficient operation of the booster. However, there are occasions when the following difficulty is encountered.

Should the wheels which are being driven by the booster engine suddenly slip it has heretofore been necessary to "knock-down" the booster latch, which immediately shuts off the supply of fluid pressure to the entire booster controlling system. In a short space of time this, of course, results in draining the system of air so that all of the partes which go to make up the booster controlling system may be thrown out of operation before the slipping of the wheels is stopped, including even the complete disentrainment of the booster gears. A very appreciable length of time is involved in draining away the air pressure and upon a subsequent reapplication of the booster power it takes an additional and rather appreciable period of time within which to effect entrainment and subsequent opening of the booster throttle. It will, therefore, be seen that the locomotive may be robbed of the assistance of the booster for a rather long interval at the very moment when such assistance is most needed.

With the foregoing in mind the primary object of my invention is to provide a means for checking or stopping the slipping of the booster-driven wheels within a space of time as short as possible and in such a way as to permit a quick reapplication of the booster power without interfering with the booster controlling system as a whole.

How this object, together with such other objects as may appear hereinafter, or are incident to my invention, are obtained, is illustrated in the preferred form in the accompanying drawings, wherein—

Figure 1:
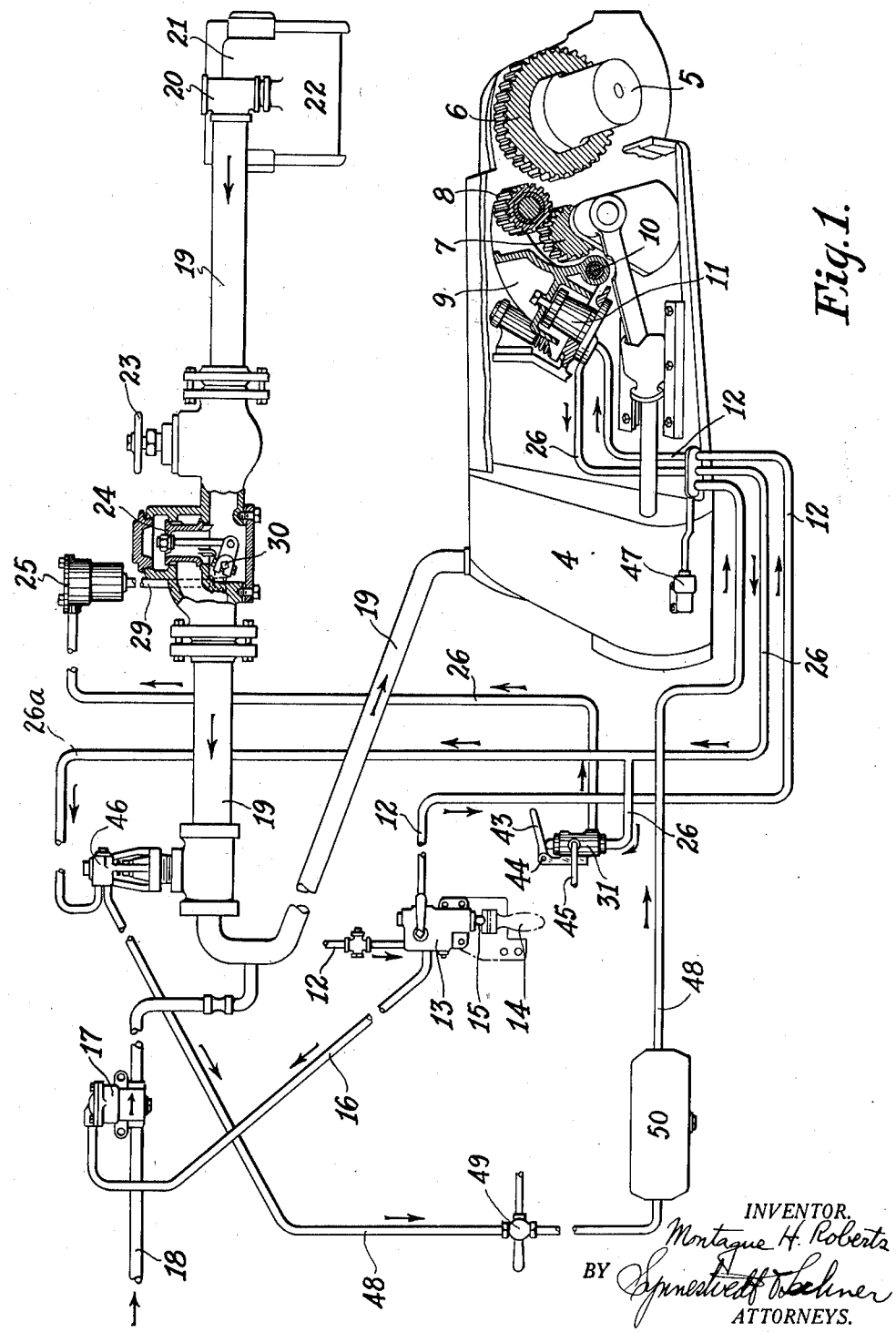
Figure 1 is a diagram of a booster motor with its controlling system, including my improved slip controlling means.

By referring to the drawings, and, in the first instance, particularly to Figure 1, it will be seen that I have shown the usual two-cylinder booster motor 4 for driving the axle 5 which may be an axle on the locomotive, on the tender, or on some other suitable vehicle in the train. A large driven gear 6 is fixed to the axle 5, and on the booster crank shaft is mounted the driving pinion 7. Entrainment is effected by means of the idler gear 8 mounted upon the rocker 9 which pivots at the point 10. The rocker 9 is moved by the entraining motor 11 when fluid pressure is supplied through the pipe 12. The idler gear 8 is in constant mesh with the driving pinion 7, but when the booster is disentrained the idler is out of mesh with the gear 6. When the rocker 9 is moved to the right, the idler gear will roll around the driving pinion 7 and mesh with the axle gear 6, at which time the booster is said to be entrained with the axle which it drives.

The fluid pressure for operating the motor 11 is preferably air pressure from the air reservoir (not shown) and the supply of this pressure through the pipe 12 is under the control of the reverse lever pilot valve 13, the function and operation of which is now very well understood in this art. It might here be said, however, that when the handle 14 (known as the booster latch) is placed in its operative position it will depress the plunger 15 and open the pipe 12, so that the air pressure can reach the entraining motor 11. The air pressure also travels through the pipe 16 to the preliminary throttle operating cylinder 17, the details of which will not be described as they form no part of the present invention, except to note that when the valve which is controlled by the operating motor 17 is opened a small amount of steam can reach the booster motor through the pipe 18.

The full operating steam for the booster cylinders is delivered through the pipe 19, into which latter pipe the pipe 18 is adapted to discharge. The pipe 19 is connected to the steam supply pipe 20 which delivers the steam to the locomotive valve chests 21 and cylinders 22 (only one of which is shown in the diagram of Figure 1).

Figure 2:
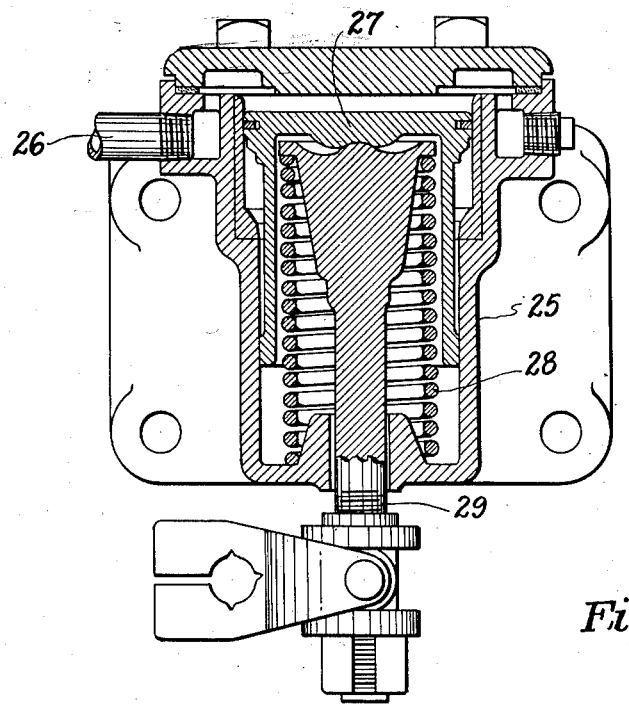
Figure 2 is a vertical sectional view of the booster throttle actuating motor.

The steam supply pipe 19 is equipped with two separate valves, namely, the hand shut-off valve 23 and the booster throttle valve 24. The throttle valve is opened by means of the throttle operating cylinder 25, the details of which are illustrated in Figure 2. After the booster motor is entrained the air pressure will pass outwardly through the pipe 26 which delivers the fluid pressure to the face of the piston 27 in the operating cylinder 25. The piston 27 will then be depressed against the pressure of the spring 28, and its operating stem 29, through the medium of the lever mechanism 30, will raise the booster throttle 24 in order to permit passage of operating steam from the pipe 20, through the pipe 19, to the booster 4.

At the same time the air pressure can reach the pilot device 46 through the pipe 26a where it is blocked until suitable steam pressure exists in pipe 19, after which it passes on to the operating mechanism 47 for the booster cylinder cocks through pipe 48 in which is located the usual cut-out valve 49 and timing reservoir 50. This is now well known in the art, and, therefore, will not be described in greater detail.

Figure 3:
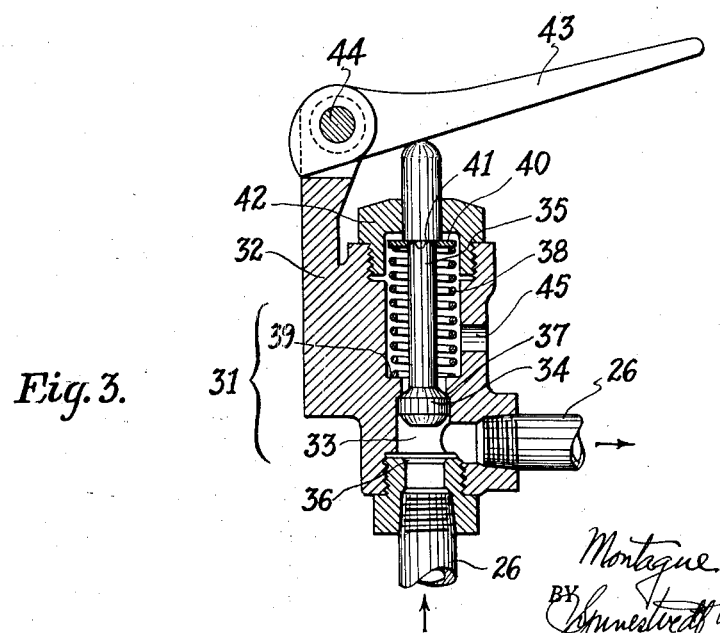
Figure 3 is a vertical sectional view through a valve mechanism employed in my invention.

In case the booster driven wheel should slip I provide the pipe 26 with the valve mechanism 31, the details of which are illustrated in Figure 3. The mechanism comprises a housing 32 having a chamber 33 which forms part of the line of communication through the pipe 26, as clearly shown in Figure 3. A valve 34 having a stem 35 is normally held away from valve seat 36 and in contact with the valve seat 37 by means of the spring 38 which reacts between a shoulder 39 in the housing and a washer 40 under the shoulder 41 on the stem 35. The stem 35 projects through a bonnet 42 to the outside of the housing 32 in the path of motion of an operating lever or handle 43 pivoted at the point 44.

When the handle 43 is depressed the valve 34 will be forced against the seat 36 and away from the seat 37. In this way communication between the two sections of the pipe 26 is interrupted so that air pressure will no longer be delivered to the throttle operating cyclinder 25. At the same time whatever air may be entrapped in the portion of the line 26 between the valve 31 and the throttle operating cylinder 25 will escape through the chamber 33 past the seat 37 and out through the exhaust passage 45 to the atmosphere.

The operation of the device is as follows, assuming, of course, that the booster has been entrained and that it is operating as a driving factor. Should the booster wheels slip, the engineer presses upon the lever 43 which immediately closes the pipe 26 and permits the air in the booster throttle operating cylinder to be discharged to the atmosphere. The result is an almost instantaneous closing of the booster throttle because the time necessary to exhaust the air through the housing 31 is practically negligible and is in marked contrast to the length of time which has heretofore been necessary where the engineer was forced to lower the booster latch 14 in order to throw the booster controlling system out of operation. As soon as the slipping has been stopped, the engineer releases the lever 43 and the valve 34 immediately goes back to its normal position which permits the fluid pressure to again reach the operating cylinder 25 to open the booster throttle. This action also takes place in an extremely short interval of time, so that the locomotive is robbed of the assistance of the booster for only a fraction of the period heretofore necessary in order to overcome slipping of the booster wheels.

Figure 4:
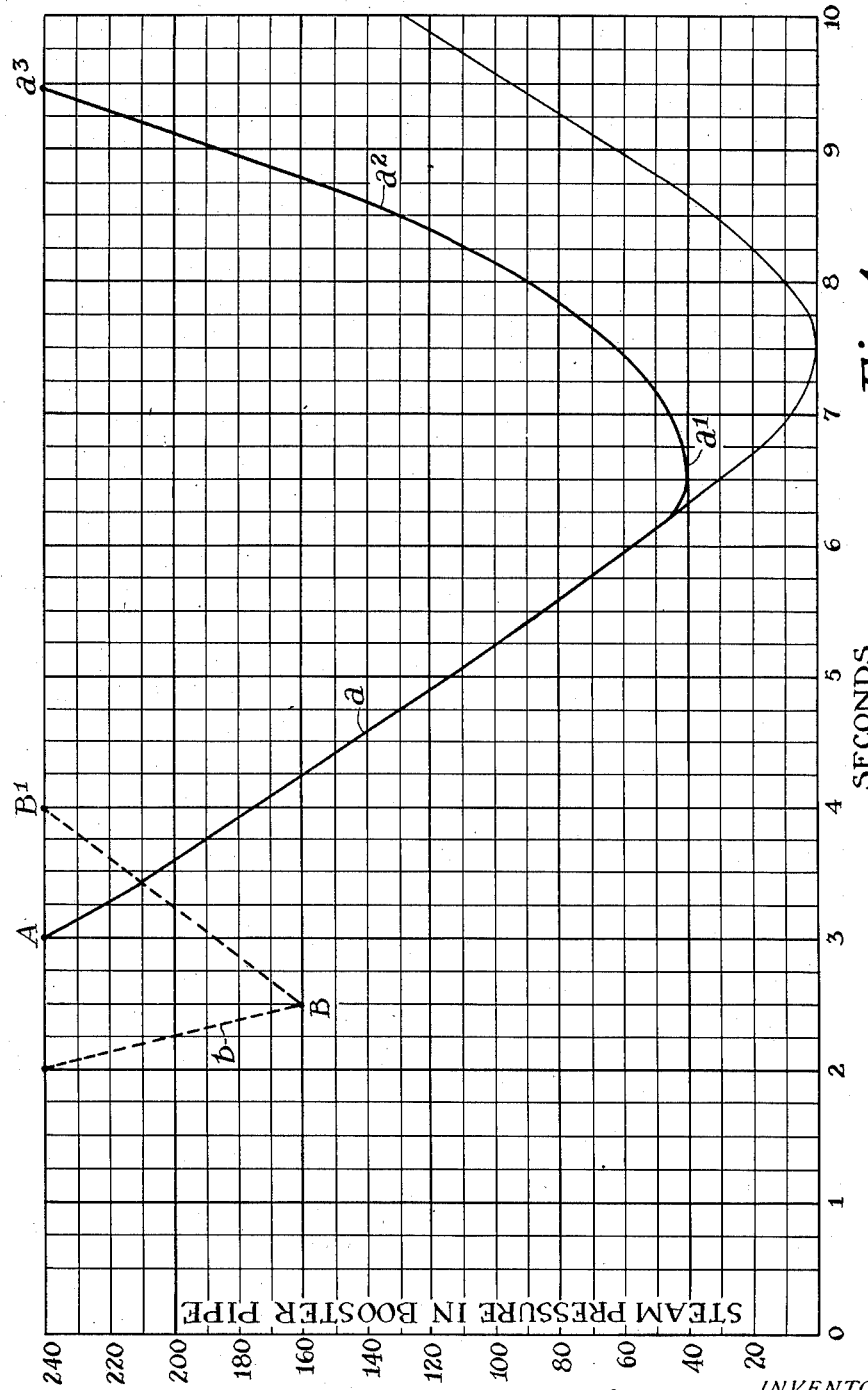
Figure 4 is a diagram which roughly compares the old method of stopping slipping with that which is possible with my improvements.

The character of the operation which is possible with my improvements is contrasted with what has been customary heretofore in the diagram of Figure 4 where the steam pressure in the booster inlet pipe 19 is shown vertically in pounds, and time horizontally in seconds. Assuming the pressure in steam pipe 19 to be 240 pounds with the booster in operation, the wheels might slip, say, at the point marked two seconds. With previous controlling systems the engineer would move the latch 14 to inoperative position in order to shut off the supply of air pressure. About a second will elapse before the air is dissipated from the system as shown by the point A on the curve $a$. At some point, say, $a'$, the slipping having been stopped as a result of the closing of the booster throttle, the engineer will again move the latch 14 to its operative position, whereupon the system will again be filled with air pressure in accordance with the curve $a^2$ and after the throttle 24 is reopened, the full steam pressure of 240 pounds will once more become available in the pipe 19 for creating torque on the booster driven wheels. This may occur at the point $a^3$.

With my improvements, however, should the booster wheels slip at two seconds, the engineer moves the lever 43 to shut off the supply of air pressure to the throttle operating piston 27 which almost instantly acts to close the throttle 24 because the entire system does not have to be drained of air pressure and the distance from the valve 31 to the cylinder 25 is comparatively short. The pressure in steam pipe 19 will promptly drop as shown by the curve $b$ until at the point B the wheels will stop slipping. The engineer then releases the lever 43 whereupon the air pressure will just as quickly return to cylinder 25 to depress piston 27 and open the throttle valve 24. At point B′ full steam pressure will once more be established in pipe 19 but in a period of time which is very much less than that which is necessary in former practice. With my improvements, therefore, slipping can be stopped in approximately half a second with only about 30% loss of the booster driving power. The time involved in the whole operation has proved, by actual test, to be so short that the idler gear 8 will not be thrown out of mesh by the gear 6, and the booster remains in operation substantially uninterruptedly, which is exceedingly important from a practical operating standpoint.

In conclusion, I should like to point out that by my improvements the supply of steam to the booster is not entirely shut off when the engineer finds it necessary to stop slipping, because the supply through the preliminary throttle device 17 is in no way interfered with. In other words, if the steam coming through the pipe 19 past the throttle 24 and the steam coming in through the preliminary device 17 be considered together as the entire steam supply for the booster, my improvements simply result in reducing the total supply sufficiently to stop slipping without entirely shutting it off and without otherwise interfering with the booster controlling system.

I claim:—

1. In a locomotive, the combination of a normally disentrained and inoperative booster motor therefor, steam supply means for the booster, a controlling system adapted to entrain the booster and open the steam supply means, and means for reducing the supply of steam sufficiently to stop slipping of the booster wheels without effecting disentrainment.

2. In a locomotive booster apparatus of the type in which the booster can be entrained and disentrained from the axle which it is adapted to drive and in which a throttle valve is provided for controlling supply of steam to the booster cylinders, the combination of a controlling system characterized by the fact that a primary means is provided for jointly controlling the entraining mechanism and the throttle operating mechanism, and further by the fact that a secondary means is provided for independently effecting closure of the throttle without causing a disentrainment.

3. The combination of a normally disentrained locomotive booster motor, a throttle valve therefor, fluid pressure actuated means for entraining said motor and for opening said throttle, common means for controlling the fluid to said entraining means and to said throttle opening means, and means for independently shutting off the supply of fluid to the throttle opening means.

4. The combination of a locomotive booster motor, fluid actuated means for entraining and disentraining said motor, a throttle valve for said motor, fluid actuated means for opening said throttle valve, a reverse lever pilot valve for controlling the supply of fluid to both of said means and a supplemental valve for independently shutting off the supply of fluid to the throttle opening means.

5. The combination of a normally disentrained locomotive booster motor, a fluid pressure actuated motor for entraining said booster, a fluid pressure supply line for said entraining motor, a reverse lever pilot valve for controlling the flow of fluid through said line, a throttle valve for the booster, a fluid pressure actuated motor for opening said throttle valve, a fluid pressure supply line for delivering fluid pressure to said throttle opening motor after entrainment has been effected, and a valve mechanism in said last-mentioned supply line for shutting off the supply of fluid pressure to the throttle operating motor and exhausting entrapped fluid pressure.

6. In a locomotive, the combination of a normally disentrained and inoperative booster motor therefor, steam supply means for the booster, a controlling system adapted to entrain the booster and open the steam supply means, and means for reducing the supply of steam sufficiently to stop slipping of the booster wheels without effecting disentrainment or causing excessive loss of torque.

7. Booster motor equipment for a locomotive including, in combination with a booster steam supply and its normal controlling means, a mechanism for stopping slipping of the booster driven wheels including a manually operable quick action control device operatively associated with said control means to provide relatively quick actuation of the said control means to momentarily restrict the steam supply.

In testimony whereof I have hereunto signed my name.

MONTAGUE H. ROBERTS.